(12) United States Patent
Bhat et al.

(10) Patent No.: US 11,579,886 B2
(45) Date of Patent: Feb. 14, 2023

(54) SYSTEM AND METHOD FOR MULTI-LEVEL CLASSIFICATION OF BRANCHES

(71) Applicant: International Business Machines Corporation, Armonk, NY (US)

(72) Inventors: Puneeth A. H. Bhat, Bangalore (IN); Satish Kumar Sadasivam, Erode (IN); Shruti Saxena, Kanpur (IN)

(73) Assignee: International Business Machines Corporation, Armonk, NY (US)

( * ) Notice: Subject to any disclaimer, the term of this patent is extended or adjusted under 35 U.S.C. 154(b) by 382 days.

(21) Appl. No.: 15/865,756

(22) Filed: Jan. 9, 2018

(65) Prior Publication Data

US 2019/0213011 A1 Jul. 11, 2019

(51) Int. Cl.
*G06F 9/38* (2018.01)

(52) U.S. Cl.
CPC .......... *G06F 9/3844* (2013.01); *G06F 9/3806* (2013.01); *G06F 9/3846* (2013.01); *G06F 9/3848* (2013.01)

(58) Field of Classification Search
CPC .... G06F 9/3844; G06F 9/3846; G06F 9/3848; G06F 9/3806
See application file for complete search history.

(56) References Cited

U.S. PATENT DOCUMENTS

| | | | | |
|---|---|---|---|---|
| 5,822,577 A * | 10/1998 | Ekanadham | .......... | G06F 9/3844 712/240 |
| 5,909,573 A * | 6/1999 | Sheaffer | .................. | G06F 9/325 712/240 |
| 5,933,628 A * | 8/1999 | Chang | .................... | G06F 8/4451 712/233 |
| 6,427,206 B1 * | 7/2002 | Yeh | ........................ | G06F 9/3844 712/236 |
| 6,502,188 B1 * | 12/2002 | Zuraski, Jr. | ........... | G06F 9/3806 712/234 |
| 7,409,535 B2 * | 8/2008 | Park | .................... | G06F 9/30061 712/235 |

(Continued)

FOREIGN PATENT DOCUMENTS

GB 2517876 B 3/2017

OTHER PUBLICATIONS

Chang et al., "Branch Classification: a New Mechanism for Improving Branch Predictor Performance", 1994, pp. 22-31.

(Continued)

*Primary Examiner* — David J. Huisman
(74) *Attorney, Agent, or Firm* — Scully, Scott, Murphy & Presser, P.C.

(57) ABSTRACT

A processor including a processor pipeline having one or more execution units configured to execute branch instructions, a branch predictor coupled to the processor pipeline and configured to predict a branch instruction outcome, and a branch classification unit coupled to the processor pipeline and the branch prediction unit. The branch classification unit is configured to, in response to detecting a branch instruction, classify the branch instruction as at least one of the following: static taken branch, static not-taken branch, simple easy-to-predict branch, flip flop hard-to-predict (HTP) branch, dynamic HTP branch, biased positive HTP branch, biased negative HTP branch, and other HTP branch.

18 Claims, 7 Drawing Sheets

| tag | Confusion Matrix | | Current Branch Outcome (CB) | Branch Switch Count (BSC) | Branch Type (Btype) | Confidence (Cnf) | U bits |
|---|---|---|---|---|---|---|---|
| | T/T | NT/T | | | | | |
| | T/NT | NT/NT | | | | | |
| .... | .... | | .... | .... | .... | .... | .... |
| .... | .... | | .... | .... | .... | .... | .... |
| .... | .... | | .... | .... | .... | .... | .... |
| .... | .... | | .... | .... | .... | .... | .... |

(56) References Cited

U.S. PATENT DOCUMENTS

| | | | |
|---|---|---|---|
| 7,673,123 B2 | 3/2010 | Hastie et al. | |
| 7,814,298 B1 * | 10/2010 | Thaik | G06F 12/0875 |
| | | | 712/207 |
| 9,201,654 B2 * | 12/2015 | Cantin | G06F 9/3848 |
| 9,477,478 B2 * | 10/2016 | Kothari | G06F 9/3806 |
| 9,495,157 B1 | 11/2016 | Bradbury et al. | |
| 9,507,598 B1 | 11/2016 | Bonanno et al. | |
| 9,563,430 B2 | 2/2017 | Bonanno et al. | |
| 2005/0257036 A1 | 11/2005 | Prasky et al. | |
| 2013/0198490 A1 * | 8/2013 | Tran | G06F 9/3804 |
| | | | 712/205 |
| 2014/0229721 A1 | 8/2014 | Forsyth et al. | |
| 2017/0068539 A1 | 3/2017 | Dundas et al. | |
| 2017/0115988 A1 | 4/2017 | Jung | |
| 2018/0314524 A1 * | 11/2018 | Keskin | G06F 9/3806 |

OTHER PUBLICATIONS

Driesen et al., "The Cascaded Predictor: Economic and Adaptive Branch Target Prediction", Jun. 22, 1998, pp. 1-16.

Juang, "Classification-Based Hybrid Branch Prediction", Mar. 24, 2000, 62 pages.

* cited by examiner

| tag | Confusion Matrix | | Current Branch Outcome (CB) | Branch Switch Count (BSC) | Branch Type (Btype) | Confidence (Cnf) | U bits |
|---|---|---|---|---|---|---|---|
| | T/T | NT/T | | | | | |
| | T/NT | NT/NT | | | | | |
| ... | ... | ... | ... | ... | ... | ... | ... |
| ... | ... | ... | ... | ... | ... | ... | ... |
| ... | ... | ... | ... | ... | ... | ... | ... |

FIG. 4

| | BTag | T/T | T/NT | NT/T | NT/NT | CB | BSC | U bit |
|---|---|---|---|---|---|---|---|---|
| 0 | | | | | | | | |
| 1 | | | | | | | | |
| ⋮ | | | | | | | | |
| 511 | | | | | | | | |

FIG. 5A

| | BTag | T/T | T/NT | NT/T | NT/NT | CB | BSC | U bit |
|---|---|---|---|---|---|---|---|---|
| 0 | | | | | | | | |
| 1 | | | | | | | | |
| 2 | | | | | | | | |
| ⋮ | | | | | | | | |
| 63 | | | | | | | | |

SYSTEM AND METHOD FOR MULTI-LEVEL CLASSIFICATION OF BRANCHES

BACKGROUND

The present invention relates to executions in a processor and more specifically to multi-level classification of branches to increase the efficiency of a processor executing branch instructions.

Modern computer systems typically contain several integrated circuits (ICs), including a processor which may be used to process information in the computer system. The data processed by a processor may include computer instructions which are executed by the processor as well as data which is manipulated by the processor using the computer instructions. The computer instructions and data are typically stored in a main memory in the computer system.

Processors typically process instructions by executing the instruction in a series of small steps. In some cases, to increase the number of instructions being processed by the processor (and therefore increase the speed of the processor), the processor may be pipelined. Pipelining refers to providing separate stages in a processor where each stage performs one or more of the small steps necessary to execute an instruction, i.e., several instructions are overlapped in execution. In some cases, the pipeline (in addition to other circuitry) may be placed in a portion of the processor referred to as the processor core. Some processors may have multiple processor cores, and in some cases, each processor core may have multiple pipelines. Where a processor core has multiple pipelines, groups of instructions (referred to as issue groups) may be issued to the multiple pipelines in parallel and executed by each of the pipelines in parallel.

Branch instructions (or "branch") can be either unconditional, meaning that the branch is taken every time that the instruction is encountered in the program, or conditional, meaning that the branch is either taken or not taken, depending upon a condition. Processors typically provide conditional branch instructions which allow a computer program to branch from one instruction to a target instruction (thereby skipping intermediate instructions, if any) if a condition is satisfied. If the condition is not satisfied, the next instruction after the branch instruction may be executed without branching to the target instruction. Most often, the instructions to be executed following a conditional branch are not known with certainty until the condition upon which the branch depends has been resolved. These types of branches can significantly reduce the performance of a pipeline processor since they may interrupt the steady supply of instructions to the execution hardware. Branch predictors attempt to predict the outcome of conditional branch instructions in a program before the branch instruction is executed. If a branch is mispredicted, all of the speculative work, beyond the point in the program where the branch is encountered, must be discarded. Therefore, a highly-accurate branch prediction mechanism is beneficial to a high-performance, pipelined processor where branch prediction may be used to predict the outcome of conditional branch instructions. For example, when a conditional branch instruction is encountered, the processor may predict which instruction will be executed after the outcome of the branch condition is known. Then, instead of stalling the pipeline when the conditional branch instruction is issued, the processor may continue issuing instructions beginning with the predicted next instruction.

Many early implementations of branch predictors used simple history bits and counter-based schemes that provide branch prediction accuracy of about 85-90%. Attempts to improve upon the accuracy of simple 2-bit counter schemes have included predictors that relate the sub-history information of a branch to the most recently executed branches via a shift register. Among the methods used to predict branches are local branch prediction and global branch prediction. Local branch prediction involves making a prediction based on the behavior of a particular branch the past few times it was executed. Local branch prediction is effective for branches exhibiting repetitive patterns. On the other hand, global branch prediction involves making a branch prediction based on the history of the last few branches to have been executed. Global branch prediction is useful when the behavior of a branch is related to the behavior of the prior executed branches.

While history-based dynamic branch predictors have reached high prediction accuracy, certain branch types continue to mispredict. These are branches that may depend on longer history length, have loaded data values or exhibit random behavior (e.g., multi-target indirect branches and data-dependent direct and indirect branches). These are hard-to-predict branches since their outcome do not always exhibit repeatable patterns and trying to predict the outcome of such branches using typical branch predictors result in bottlenecks and low-performance.

Classifying branches to identify such hard-to-predict branches (or other types of branches) and selecting a branch predictor based on the type of branch may improve accuracy and performance.

SUMMARY OF THE INVENTION

The summary of the disclosure is given to aid understanding of the memory system, architectural structure and method of storing and fetching data, and not with an intent to limit the disclosure or the invention. The present disclosure is directed to a person of ordinary skill in the art. It should be understood that various aspects and features of the disclosure may advantageously be used separately in some instances, or in combination with other aspects and features of the disclosure in other instances. Accordingly, variations and modifications may be made to the memory systems, architectural structure and method of operation to achieve different effects.

The present invention generally provides improved methods and systems for classifying branch instructions in a processor. In one embodiment, the system is a computing system that includes a memory and a processor. The processor also includes a processor pipeline comprising one or more execution units configured to execute branch instructions, a branch predictor coupled to the processor pipeline and configured to predict a branch instruction outcome, and a branch classification unit coupled to the processor pipeline and the branch prediction unit. The branch classification unit is configured to, in response to detecting a branch instruction, classify the branch instruction as at least one of the following: static taken branch, static not-taken branch, simple easy-to-predict branch, flip flop hard-to-predict (HTP) branch, dynamic HTP, biased positive HTP, biased negative HTP, and other HTP.

In an embodiment, the branch classification unit may comprise a branch classification table (BCT). The BCT may include one or more entries each comprising a confusion matrix configured to record an actual behavior and a predicted behavior of a branch instruction. The confusion matrix may comprise the following fields: Actual Taken/Predicted Taken (T/T), Actual Not Taken/Predicted Taken (NT/T), Actual Taken/Predicted Not Taken (T/NT), and Actual Not Taken/Predicted Not Taken (NT/NT). Each of the fields of the confusion matrix may be 6-bit long. In certain embodiments, each of one or more entries of the BCT may also include a tag field, a current branch outcome field, a branch switch count field, a branch type field, a confidence field, and/or a usefulness bits field. The system may track usefulness of a branch instruction by incrementing a U bits field in the BCT every time the branch instruction is executed. The system may also calculate a confidence level of a branch classification and update the confidence field accordingly.

In various embodiments, the one or more entries of the BCT may be organized as a direct-mapped table, a fully associative table, and/or an n-way set associative table.

In some embodiments, the branch classification unit may be configured to, in response to detecting a branch instruction, classify the branch instruction by extracting a tag from an instruction address of the detected branch instruction and using the tag to determine whether at least one of the entries of the one or more entries of the BCT corresponds to the detected branch instruction. If none of the entries of the one or more entries of the BCT correspond to the detected branch instruction, the system may create a new entry in the BCT to correspond to the detected branch instruction, and initialize a branch type field in the BCT by assigning an initial classification of a simple easy-to-predict branch to the detected branch instruction. The system may further predict an outcome of the detected branch instruction by the branch predictor, executing the detected branch instruction by the processor pipeline, update the confusion matrix to record an actual behavior and a predicted behavior of the detected branch instruction, update a current branch outcome field of the BCT and a branch switch count field of the BCT based on the actual behavior of the detected branch instruction, compute a set of classifier parameters using values included in the updated confusion matrix, the current branch outcome field, and the branch switch count field, and classify the detected branch instruction based on the set of classifier parameters. The system may then update the branch type field of the BCT based on the classification.

Optionally, if at least one of the entries of the one or more entries of the BCT corresponds to the detected branch instruction, the system may classify the branch instruction by predicting an outcome of the detected branch instruction, executing the detected branch instruction, updating the confusion matrix to record an actual behavior and a predicted behavior of the detected branch instruction, updating a current branch outcome field of the BCT and a branch switch count field of the BCT based on the actual behavior of the detected branch instruction, computing a set of classifier parameters using values included in the updated confusion matrix, the current branch outcome field, and the branch switch count field, and classifying the detected branch instruction based on the set of classifier parameters. In at least one embodiment, the system may also reset the confusion matrix upon classification of the detected branch instruction.

BRIEF DESCRIPTION OF THE DRAWINGS

The various aspects, features and embodiments of the memory system, architectural structure and its method of operation will be better understood when read in conjunction with the figures provided. Embodiments are provided in the figures for the purpose of illustrating aspects, features and/or various embodiments of the memory system, architectural structure and method of operation, but the claims should not be limited to the precise arrangement, structures, features, aspects, embodiments or devices shown, and the arrangements, structures, subassemblies, features, aspects, embodiments, methods, and devices shown may be used singularly or in combination with other arrangements, structures, subassemblies, features, aspects, embodiments, methods and devices.

DETAILED DESCRIPTION

The following description is made for illustrating the general principles of the invention and is not meant to limit the inventive concepts claimed herein. In the following detailed description, numerous details are set forth in order to provide an understanding of the memory system, architectural structure and method of operation, however, it will be understood by those skilled in the art that different and numerous embodiments of the memory system, architectural structure and method of operation may be practiced without those specific details, and the claims and invention should not be limited to the embodiments, subassemblies, features, processes, methods, aspects, features of details specifically described and shown herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc. It must also be noted that, as used in the specification and the appended claims, the singular forms "a," "an" and "the" include plural referents unless otherwise specified.

Figure 1:
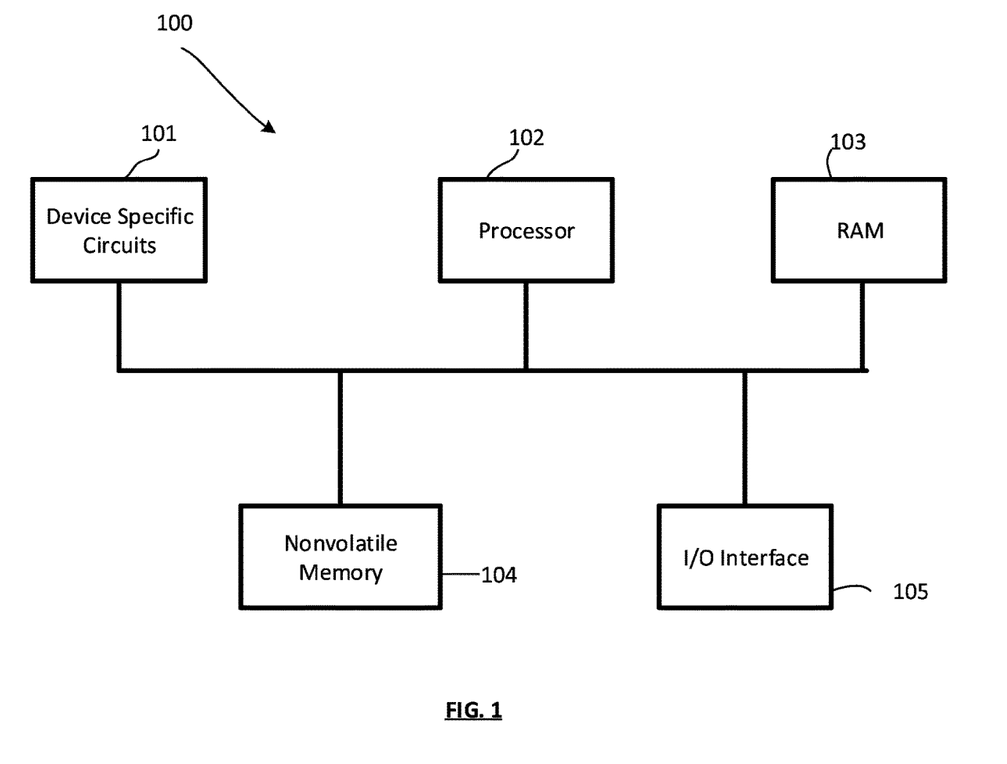
FIG. 1 depicts a general computing or data processing system in accordance with one embodiment.

A computing or data processing system 100 suitable for storing and/or executing program code may take many forms and in one embodiment may include at least one processor 102, which may be or be part of a controller, coupled directly or indirectly to memory devices or elements through a system bus, as shown in FIG. 1. Computing system 100 in FIG. 1 is shown with a processor 102, Random Access Memory (RAM) 103, nonvolatile memory 104, device specific circuits 101, and I/O interface 105. Alternatively, the RAM 103 and/or nonvolatile memory 104 may be contained in the processor 102 as could the device specific circuits 101 and I/O interface 105. The processor 102 may comprise, for example, an off-the-shelf microprocessor, custom processor, Field Programmable Gate Array (FPGA), Application Specific Integrated Circuit (ASIC), discrete logic, etc., or generally any device for executing instructions. The RAM 103 is typically used to hold variable data, stack data, executable instructions, etc., and may include Dynamic Random Access Memory or DRAM.

According to various approaches, the nonvolatile memory 104 may comprise any type of nonvolatile memory such as, but not limited to, Electrically Erasable Programmable Read Only Memory (EEPROM), flash Programmable Read Only Memory (PROM), battery backup RAM, hard disk drives, etc. The nonvolatile memory 104 is typically used to hold the executable firmware and any nonvolatile data containing programming instructions that can be executed to cause the processor 102 to perform certain functions.

In some embodiments, the I/O interface 105 may include a communication interface that allows the processor 102 to communicate with devices external to the controller. Examples of the communication interface may comprise, but are not limited to, serial interfaces such as RS-232, USB (Universal Serial Bus), Small Computer Systems Interface (SCSI), RS-422 or a wireless communication interface such as Wi-Fi, Bluetooth, near-field communication (NFC) or other wireless interfaces. The computing system 100 may communicate with an external device via the communication interface 105 in any communication protocol such as Automation/Drive Interface (ADI).

Figure 2:
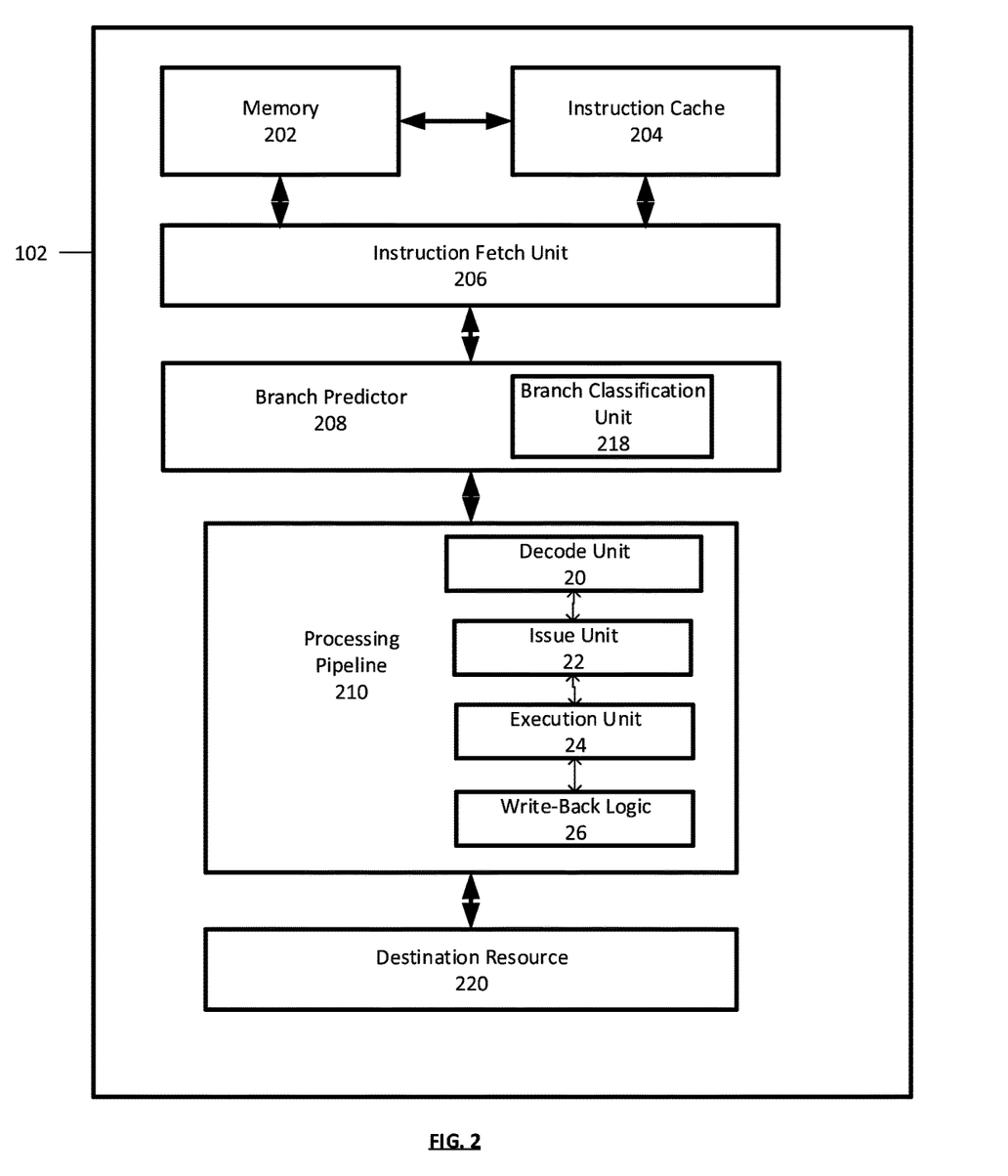
FIG. 2 depicts a block diagram of a processor in accordance with an embodiment.

FIG. 2 depicts a block diagram of a processor 102 according to an embodiment. The processor 102 includes a memory 202, an instruction cache 204, an instruction fetch unit 206, a branch predictor 208, a branch classification unit 218, and a processing pipeline 210. The processor 102 may be included within a computer processor or otherwise distributed within a computer system. Instructions and data can be stored in memory 202, and the instruction cache 204 may access instructions in memory 202 and store the instructions to be fetched. The memory 202 may include any type of volatile or nonvolatile memory, such as cache memory. The memory 202 and instruction cache 204 can include multiple cache levels. A data cache (not depicted) may also be included in the processor 102. In one embodiment, instruction cache 204 may be configured to instructions in an 8-way set associative structure. Alternatively, any other desired configuration and size may be employed. For example, instruction cache 204 may be implemented as a fully associative, set associative, or direct mapped configuration.

In FIG. 2, a simplified example of the instruction fetch unit 206 and the processing pipeline 210 are depicted. In various embodiments, the processor 102 may include multiple processing pipelines 210 and instruction fetch units 206. In an embodiment, the processing pipeline 210 includes a decode unit 20, an issue unit 22, an execution unit 24, and write-back logic 26. The instruction fetch unit 206 and/or the branch predictor 208 may also be part of the processing pipeline 210. The processing pipeline 210 may also include other features, such as error checking and handling logic, reorder buffer, one or more parallel paths through the processing pipeline 210, and other features now or hereafter known in the art. While a forward path through the processor 102 is depicted in FIG. 2, other feedback and signaling paths may be included between elements of the processor 102.

The instruction fetch unit 206 fetches instructions from the instruction cache 204 according to an instruction address, for further processing by the decode unit 20. The decode unit 20 decodes instructions and passes the decoded instructions, portions of instructions, or other decoded data to the issue unit 22. The decode unit 20 may also detect branch instructions which were not predicted by branch predictor 208. The issue unit 22 analyzes the instructions or other data and transmits the decoded instructions, portions of instructions, or other data to one or more execution units in the execution unit 24 based on the analysis. The execution unit 24 executes the instructions and determines if the predicted branch direction is incorrect. The branch direction may be "taken", in which subsequent instructions are fetched from the target address of the branch instruction. Conversely, the branch direction may be "not taken", in which subsequent instructions are fetched from memory locations consecutive to the branch instruction. When a mispredicted branch instruction is detected, instructions subsequent to the mispredicted branch are discarded from the various units of processor 102. The execution unit 24 may include a plurality of execution units, such as fixed-point execution units, floating-point execution units, load/store execution units, and vector multimedia execution units. The execution unit 24 may also include a count cache to predict branch to count register (bcctr) instructions. The write-back logic 26 writes results of instruction execution back to a destination resource 220. The destination resource 220 may be any type of resource, including registers, cache memory, other memory, I/O circuitry to communicate with other devices, other processing circuits, or any other type of destination for executed instructions or data. One or more of the processor pipeline units may also provide information regarding the execution of conditional branch instructions to the branch predictor 208.

In an embodiment, processor 102 may perform branch prediction in order to speculatively fetch instructions subsequent to conditional branch instructions. Branch predictor 208 is included to perform such branch prediction operations. In an embodiment, instruction cache 204 may provide to the branch predictor 208 an indication of the instruction address being fetched, so that branch predictor 208 may determine which branch target addresses to select for forming a branch prediction. The branch predictor 208 may be coupled to various parts of the processing pipeline 210, such as, for example, execution unit 24, decode unit 20, reorder buffer, etc. to determine if the predicted branch direction is correct or incorrect.

In an embodiment, a variety of suitable branch prediction algorithms may be employed by the branch predictor 208. The branch predictor 208 may include any combination of primary branch prediction structures or circuits, such as a branch target buffer (BTB), a branch history table (BHT), one or more pattern history tables (PHT), or the like. The BTB may be set associative and include multiple sets (columns) of BTB entries and each BTB entry may include, for example, a branch address tag and a predicted target address. The BTB may also be direct mapped or fully-associative. The BTB may be a global buffer that records the outcome of every branch that executes, or it may be a per-branch buffer that records only the past history of the same branch. The BHT may hold branch history information that indicates whether a branch is predicted as taken or not taken. The BHT can also include prediction strength indicators for BHT direction predictions (e.g., strong not taken, weak not taken, weak taken, and strong taken). The BHT may be indexed based on an instruction address. A PHT may hold prediction strength indicators for direction predictions and tags associated with branch prediction patterns. To predict a branch in existing branch prediction hardware, the branch instruction's address is combined with the current value of the branch history. This can be a global branch history of the last k branch outcomes (such as a PHT) or a table that has a per-branch history, i.e. the last k outcomes of the same branch (such as a BHT). The resulting value is used to index into a predictor table in order to read off the prediction. After the branch actually executes, the outcome of the branch is shifted into the BTB.

In an embodiment, the branch predictor 208 also includes a branch classification unit 218 (BCU). Alternatively and/or additionally, the BCU 218 may be located separately from the branch predictor 208. In an embodiment, the branch predictor 208 and/or the BCU 218 may be included in the instruction fetch unit and/or the processor pipeline. The BCU 218 is an example of a processing circuit configured to implement branch classification with confidence and usefulness tracking.

Figure 3:
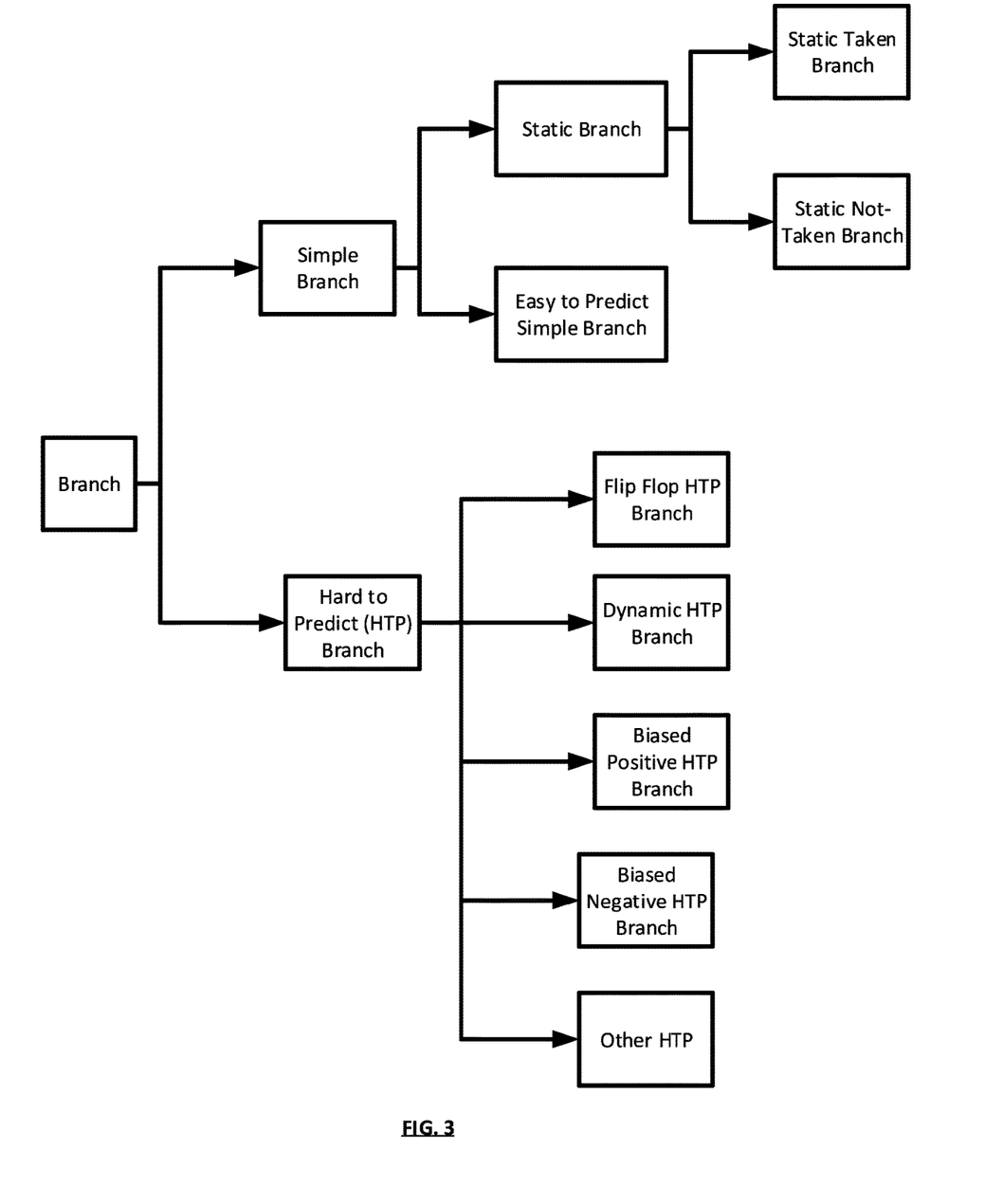
FIG. 3 illustrates branch classes or types used by a branch classification unit in accordance with an embodiment.

In an embodiment, the BCU 218 may apply a set of heuristics to implement branch classification by assigning all incoming branch instructions to one of the branch types illustrated in FIG. 3. Branch classification may partition branches into a set of branch classes statically and/or dynamically by assigning similar behavior to the same class of branches. Hence, by analyzing the behavior of a class of branches, branch prediction accuracy for that class may be optimized for a given hardware. For example, prediction accuracy may be increased by associating each branch class with a suitable predictor for that class. Specifically, resources may be allocated such that a simple predictor may be used to predict simple branches and a more complex predictor may be used to predict hard-to-predict branches. It should be understood that the heuristics described in this disclosure are the result of profiling branches in an industry standard CPU benchmark. Different classes of branches have common characteristics (such as number of branch miss-predictions) that produce the above-listed heuristics. It is appreciated that other embodiments may apply a different set of heuristics. In still other implementations, a subset of the above-listed heuristics may be utilized.

Branch classes or types illustrated in FIG. 3 are classified based on the dynamic branch execution and/or prediction behavior. As shown in FIG. 3, in an embodiment, based on their prediction accuracy, branches may be classified into simple branches and hard-to-predict (HTP) branches. Simple branches are branches whose outcome may be predicted with a high level of accuracy, and HTP branches are branches whose outcome may be predicted with a low level of accuracy. Simple branches may further be classified into static branches and easy-to-predict simple branches. Static branches are unidirectional branches and may be static taken (i.e., unidirectional taken) or static non-taken (i.e., unidirectional non-taken) branches. Simple branches are not static but may be predicted with a high accuracy are easy-to-predict simple branches. HTP branches may be classified into flip flop HTP branches (dynamic in nature that have a high switch count probability value of at least about 0.8-0.9); dynamic HTP branches (dynamic branches that have a switch count probability that is less than that of flip flop HTP branches); biased positive HTP branches (HTP that have a high miss-prediction rate and are biased towards the taken direction); biased negative HTP branches (HTP that have a high miss-prediction rate and are biased towards the not-taken direction); and normal HTP (all other types of HTP branches). It should be understood that the branch classification unit may be used to classify branch instructions into types or classes that are different and/or a subset of those illustrated in FIG. 3.

Figure 4:
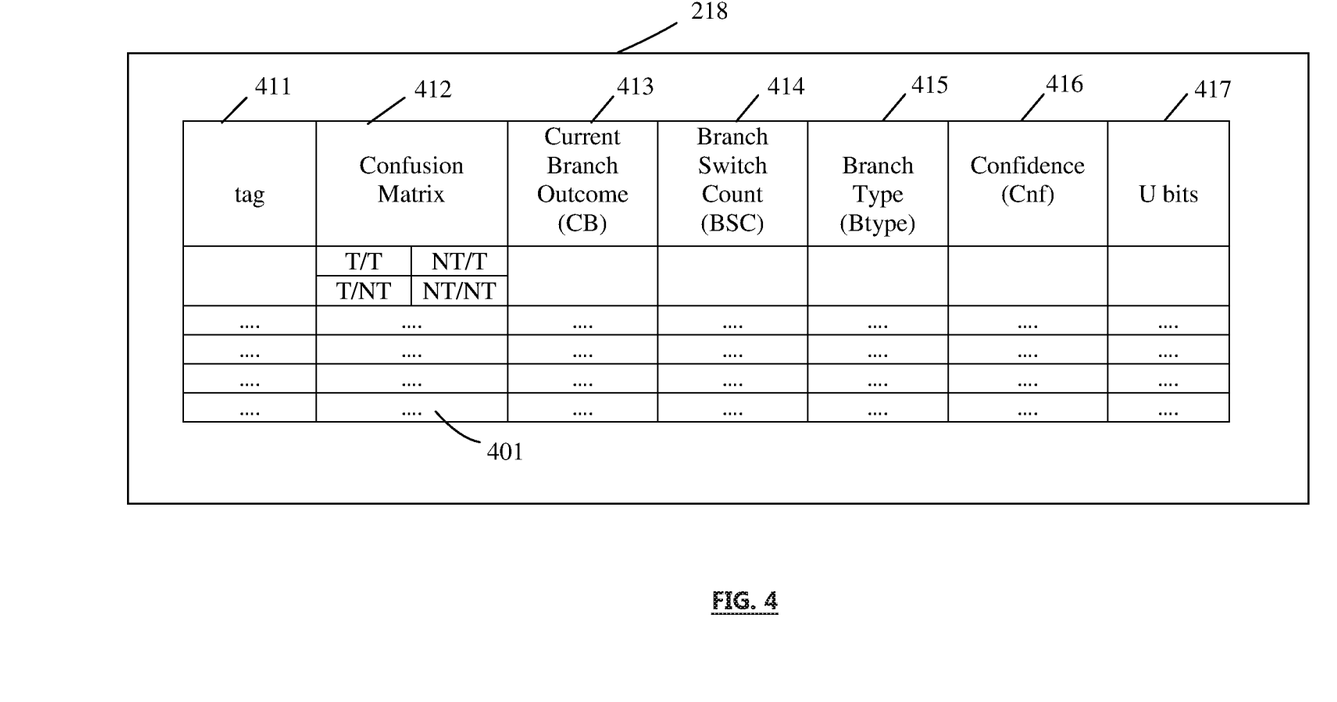
FIG. 4 depicts a branch classification unit in accordance with an embodiment.
Figure 5A:
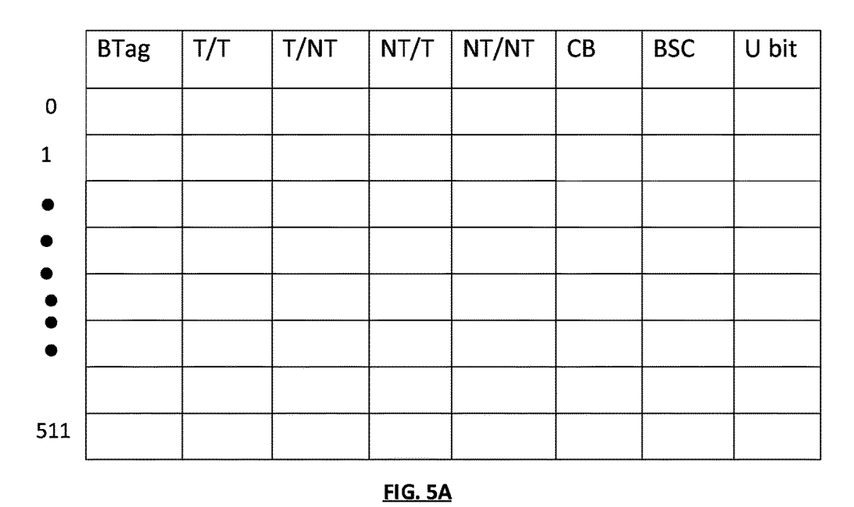
FIG. 5A illustrates a fully associative branch classification table in accordance with an embodiment.
Figure 5B:
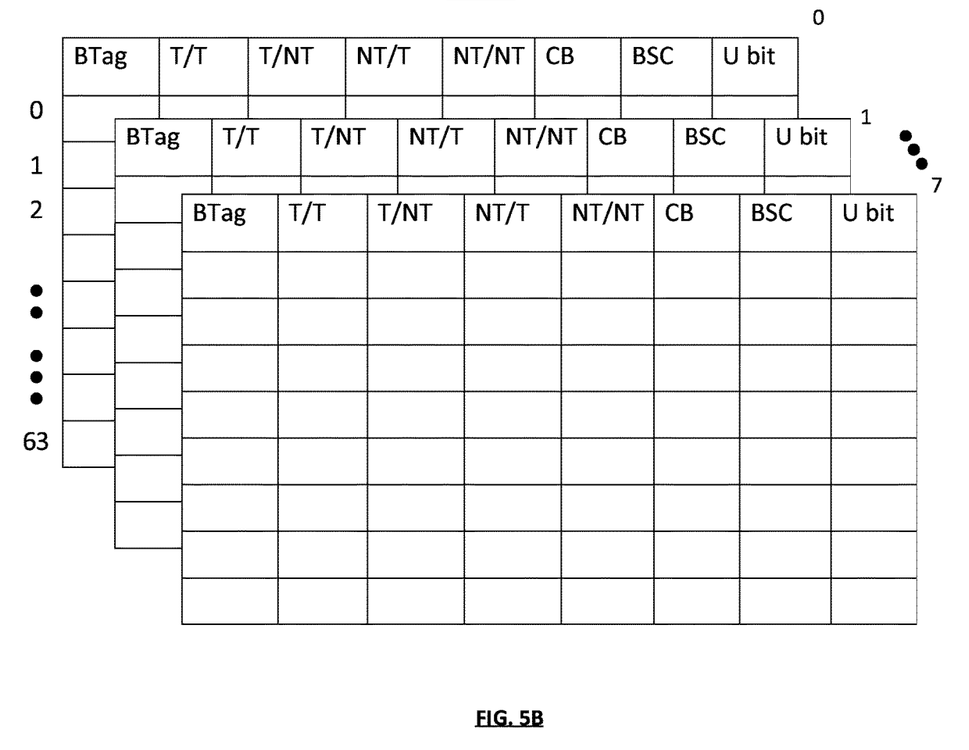
FIG. 5B illustrates an n-way set associative branch classification table in accordance with an embodiment.

FIG. 4 illustrates an example BCU 218 that is used to determine and track the branch type for branch instructions before being forwarded to the branch predictor 208, according to an embodiment. In an embodiment, the BCU 218 includes a branch classification table (BCT) 401. In an embodiment, BCT 401 may be a statistical table that stores the behavior of a conditional branch instruction and its prediction using a confusion matrix (the confusion matrix may be used to describe the performance of a classification or a prediction model). The BCT table 401 may be direct mapped, set-associative, or n-way set associative cache of branch classification information, generally organized as a table. Alternatively, any other desired configuration may be employed. FIG. 5A illustrates a fully associative BCT table. FIG. 5B illustrates an 8-way set-associative BCT table that combines the features of a fully associative scheme and a direct mapped scheme. It should be noted that an n-way set associative BCT has fewer instruction address conflicts compared to a direct mapped BCT and has faster processing speeds compared to a fully associative BCT due to reduction in the implementation complexities (without sacrificing much accuracy). However, when the BCT is implemented as a fully associative table it provides the best possible accuracy Referring back to FIG. 4, the BCT table 401 is written with information about branches executed in pipelines of processor 102 (depicted in FIG. 2) where each entry in BCT 401 represents a branch instruction. The table of BCT 401 may be indexed with instruction virtual address bits that determine the BCT set/row. Additional branch instruction address bits may be stored within the BCT entry as Btag bits (411). In an embodiment, the Btag 411 may be a tag extracted from the instruction address corresponding to the branch instruction. The Btag may be extracted from the instruction address using methods now or hereafter known to those skilled in the art such as, without limitation, using one or more significant bits, using an xor operation, or the like. In an example embodiment, the Btag may be an 11 bits tag extracted from the instruction address after right shifting 6 bits. Each set/row of the BCT 401 may further include multiple ways/columns. It should be understood that the number of index bits and tag bits will depend on the type of BCT table (fully associative, set-associative, or direct mapped), and for a fully associative BCT, index bits are not required. It will be understood to those skilled in the art that branch classification methods may work without the tag field in the BCT, but it may lead to reduced classification accuracy. The advantage of Btag field is to improve the accuracy and precision of the classification.

Figure 6:
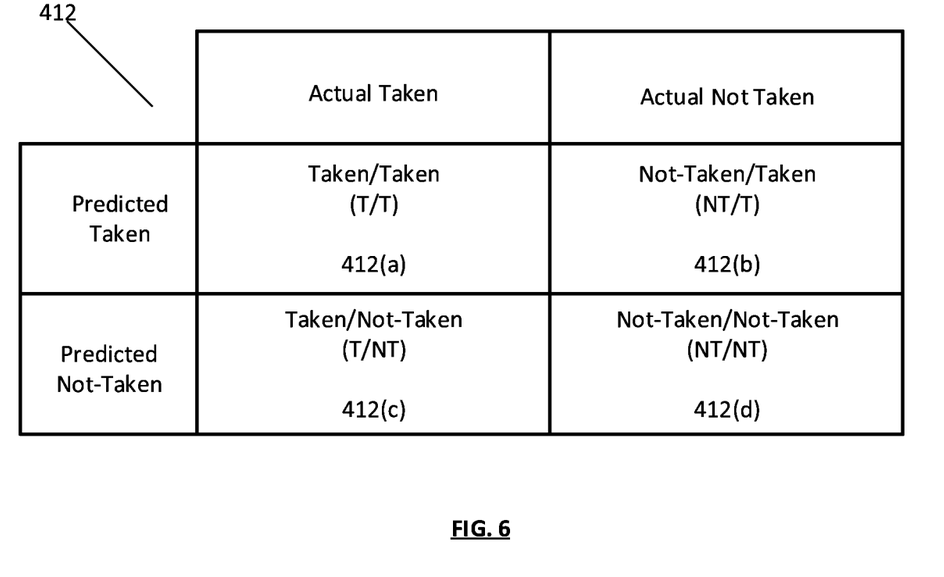
FIG. 6 illustrates a confusion matrix in accordance with an embodiment.

As shown in FIG. 4, BCT 401 also includes a confusion matrix 412 (described below), a current branch outcome bit (CB) field 413, a branch switch count (BSC) field 414. An example confusion matrix 412 for actual versus predicted outcomes of a branch is shown in FIG. 6. As is known to those skilled in the art, confusion matrix is a summary of prediction results on a classification problem. The number of correct and incorrect predictions are summarized with count values and broken down by each class. As shown in FIG. 6, the confusion matrix includes 4 fields: "Actual Taken/Predicted Taken" (T/T) 412(a), "Actual Not Taken/Predicted Taken" (NT/T) 412(b), "Actual Taken/Predicted Not Taken (T/NT)" 412(c), and "Actual Not Taken/Predicted Not Taken" (NT/NT) 412(d). Each of the fields in the confusion matrix 412 can store a 6-bits value. In an embodiment, the CB field 413 is a 1-bit field that is assigned a value 1, if the branch is taken and 0 if the branch is not taken. The BSC field 414 is a 7-bit field that counts the number of times a branch changes direction which gets incremented whenever the previous branch direction and current branch direction mismatch (i.e., whenever a branch changes direction from taken to not taken or from not taken to taken).

In an embodiment, BCT 401 shown in FIG. 4 may also include a branch type (Btype) field 415, a confidence level (Cnf) field 416, and a usefulness bits (U bits) field 417. The Btype field is a 3-bit field that provides information about the branch type. In an embodiment, a simple branch is assigned a [000] value, a static taken branch is assigned a [001] value, static not taken branch is assigned a [010] value, a flip flop HTP is assigned a [100] value, a dynamic HTP is assigned a [011] value, a positive biased HTP is assigned a [101] value, a negative biased HTP is assigned a [110] value, and a normal HTP is assigned a [111] value. In an embodiment, each new branch that does not have a corresponding entry in the BCT is initially assigned a [000] value in the Btype field, which may then be updated based on the methods discussed below. In other words, each new branch is assumed to be a simple branch. In an embodiment, the Cnf field 416 is a 2-bit field that is indicative of confidence of the branch classification type. In an embodiment, the U bits field 417 is a 2-bit field that is indicative of how often a branch instruction is executed, i.e., the usefulness of a branch. Usefulness tracking enables efficient use of space in a BCT table by identifying dormant branch instruction entries that are used infrequently and which may be replaced (i.e., have minimal operational usefulness).

It should be understood that the number of fields and the bit size of each field in the BCT 401 is provided as an example, and other bit sizes are within the scope of this disclosure in order to change, for example, precision and/or accuracy of classification, number of types of branches, branch characteristics, processing times, or the like. For example, in an embodiment, the confusion matrix 412 in BCT 401 may be replaced with 2 fields (a correct prediction field and a mis-prediction field) for classifying branches into simple branches and hard-to-predict branches only.

Figure 7:
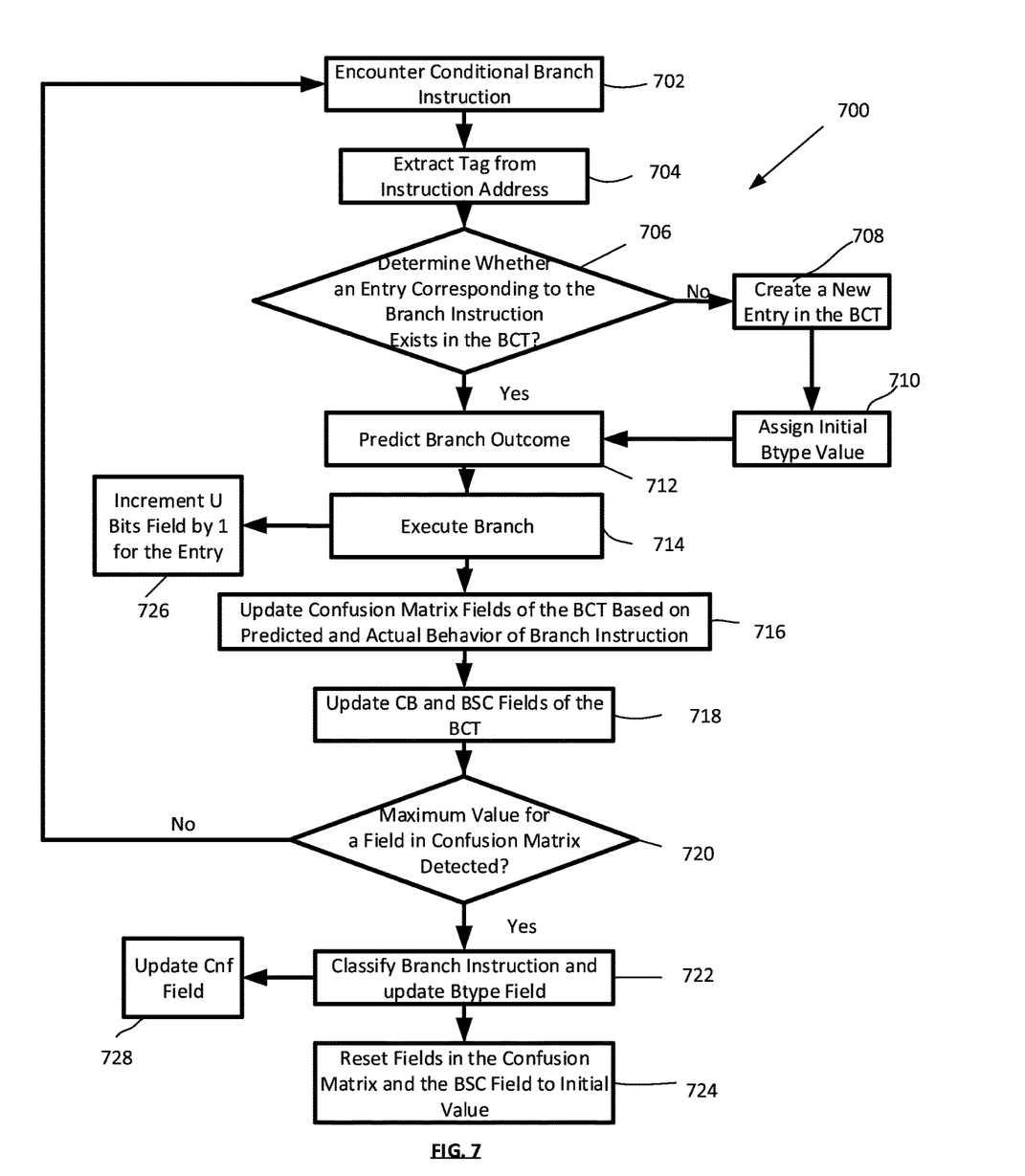
FIG. 7 illustrates an example flowchart describing a method for multi-level classification of instruction branches using the branch classification unit of FIG. 3 in accordance with an embodiment.

FIG. 7 illustrates an exemplary flowchart in accordance with one embodiment describing a method for multi-level classification of instruction branches using the BCU described above. While the classification method 700 is described for the sake of convenience and not with an intent of limiting the disclosure as comprising a series and/or a number of steps, it is to be understood that the process does not need to be performed as a series of steps and/or the steps do not need to be performed in the order shown and described with respect to FIG. 7, but the process may be integrated and/or one or more steps may be performed together, or the steps may be performed in the order disclosed or in an alternate order.

While the illustrative embodiments described above are preferably implemented in hardware, such as in functional units of a processor, various aspects of the illustrative embodiments may be implemented in software as well. For example, it will be understood that each block of the flowchart illustration in FIG. 7, and combinations of blocks in the flowchart illustration, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustration support combinations of means for performing the specified functions, combinations of steps for performing the specified functions and program instruction means for performing the specified functions. It will also be understood that each block of the flowchart illustration, and combinations of blocks in the flowchart illustration, can be implemented by special purpose hardware-based computer systems which perform the specified functions or steps, or by combinations of special purpose hardware and computer instructions.

At 702, the instruction fetch unit may encounter a conditional branch instruction for execution and may transfer it to the branch predictor for classification and prediction. At 704 the system may then extract a tag from the instruction address of the branch instruction. The system may use the extracted tag to search for an entry in the BCT to determine (706) whether or not an entry corresponding to the branch instruction already exists in the BCT.

If at 706 it is determined that an entry corresponding to the branch instruction does not exist in the BCT (706: NO), then the system may create (708) a new entry corresponding to the branch instruction using the extracted tag. At 710, the System may assign a Btype value of [000] to the branch instruction (i.e., the branch type is assumed to be a simple branch initially), and the process moves to 712. In an embodiment, for each newly created entry, the fields in the confusion matrix are initially assigned a [000000] value, the CB field is assigned a [0] (not taken) or [1] (taken) value based on the current branch behavior, the BSC field is assigned a [0000000] value, the Cnf field and the U-bits field are assigned values [00] each. In an embodiment, if the BCT is full, then the U-bits value of all the entries in the table (and/or the set in case of set-associative table) may be decreased by 1. A new entry may be created by replacing an entry that has a U-bits value equal to 0.

However, if at 706 it is determined an entry corresponding to the branch instruction exists in the BCT (706: YES), then the branch instruction is transferred to the branch predictor and branch prediction may be performed at 712. At 714, the branch instruction may be executed to determine the actual behavior of the branch instruction. It should be noted that one of the advantages of the present disclosure is that branch classification value from the BCT (for existing as well as newly created entries) may be used during branch prediction to optimize the prediction process. This feature can be particularly valuable in dynamically optimizing branch prediction and execution of the branch instruction while the classification process is running. Every time a branch instruction is executed, the U-bits field is updated (726) by incrementing the value by 1. In an embodiment, once the value in the U-bits field reaches a maximum value (i.e., 11 for a 2 bits field), the value may remain constant.

Upon execution of the branch instruction, at 716, the four fields of the confusion matrix may be updated based on the predicted and actual behavior of the branch instruction. For updating the confusion matrix, if the prediction for the branch instruction was taken and the branch was actually taken, the value in the field 412(*a*) (T/T) is incremented by 1, if the prediction for the branch instruction was not-taken and the branch was actually taken, the value in the field 412(*b*) (NT/T) is incremented by 1, if the prediction for the branch instruction was taken and the branch was actually not-taken, the value in the field 412(*c*) (T/NT) is incremented by 1, and if the prediction for the branch instruction was not-taken and the branch was actually not-taken, the value in the field 412(*d*) (NT/NT) is incremented by 1.

At 718, the CB field and the BSC fields of the BCT may be updated. In an embodiment, the CB field is assigned a value "1" if the branch instruction is actually taken and a value "0" if the branch instruction is actually not-taken. In an embodiment, the BSC field is updated to increment its value by 1 every time a branch instruction changes direction (i.e., there is a mismatch between the previous branch direction and the current branch direction). In other words, the BSC field is updated to increment its value by 1 whenever a branch instruction changes direction from taken to not taken and/or from not taken to taken from the most recent execution to the current execution of the branch instruction.

At 720, the system may determine whether a field in the confusion matrix has reached a maximum value. It should be understood to those skilled in the art that since the fields in the confusion matrix are 6-bit, the maximum value will be 64. If at 720 it is determined that a field in the confusion matrix has hit the maximum value (720: YES), then the system classifies the branch instruction (722) as discussed below. However, if at 720 it is determined that none of the fields in the confusion matrix have hit the maximum value (720: NO), then the process repeats from 702.

At 722, the system classifies the branch instruction by computing various classifier parameters based on the values in the BCT, and by applying a set of rules shown in Table 1. Various classifier parameters are calculated as shown:

Branch Count (BC)=*T/T*+*NT/T*+*T/NT*+*NT/NT*;

Miss-prediction rate (*U*)=(*T/NT*+*NT/T*)/(BC);

Accuracy (A)=[(*T/T*+*NT/NT*)/BC]*100;

Taken count (TC)=*T/T*+*T/NT*;

Not-Taken Count (NTC)=*NT/T*+*NT/NT*;

True Positive Branch (TPB)=TC/BC;

True Negative Branch (TNB)=NTC/BC;

Max Switch Count=2*min (TC,NTC);

Switch Probability=(*BSC*)/(Max Switch Count);

| | |
|---|---|
| *T/T*+*NT/T*; | Total Positive Prediction: |
| *T/NT*+*NT/NT*; | Total Negative Prediction: |
| (*T/T*)/(TC); and | Positive Prediction Rate: |
| (*NT/NT*)/(NTC). | Positive Negative Rate: |

TABLE 1

| Branch Type | Rules |
|---|---|
| Static Taken Branch | If true_positive_branch = = 1 |
| Static Not Taken Branch | If true_negative_branch = = 1 |
| Flip Flop HTP | If accuracy < THRESHOLD and Switch-count-probability > 0.9 |
| Dynamic HTP | If accuracy < THRESHOLD and Switch-count-probability < 0.7, 0.9 > |

TABLE 1-continued

| Branch Type | Rules |
|---|---|
| Biased Positive HTP | If (positive_prediction_rate-accuracy) > 0.10 : |
| Biased Negative HTP | If (negative_prediction_rate-accuracy) > 0.10 : |
| Other HTP | If accuracy < THRESHOLD |
| Simple Easy to predict Branch | Else |

In an embodiment, the threshold value used for classifying the branches may be used to control the aggressiveness of BCT and hence may be configured based on the workload of the processor. For example, a threshold of about 80% to about 90% may be used for more aggressive classification in order to identify branches which have a prediction accuracy of less than about 80% to about 90%. In another example, a threshold of about 55% to about 65% may be used for less aggressive classification in order to identify branches which have a prediction accuracy of less than about 55% to about 65%.

It should be noted that the above branch classification rules are provided as an example, and may be varied according to the needs of the workloads of the processor, domain served, applications, real estate availability, power budget, accuracy requirements, processing times, characteristics of various branch types, number of branch types, or the like, and the BCU may be configured with the desired set of rules. For example, a branch may be classified as a flip flop HTP if accuracy<THRESHOLD and Switch-count-probability>a value of about 0.8 to about 0.95. In another example, a branch may be classified as a dynamic HTP if accuracy<THRESHOLD and Switch-count-probability is less 0.6+X and greater than 0.9−Y, where X and Y may be optimized to achieve a desired result such as accuracy, precision, etc.

Once a branch instruction is classified, the Btype field in the BCT may be updated to reflect the value corresponding to the branch type. At 724, the fields in the confusion matrix and the BSC field may be reset to their initial values.

At 728, the system may also update the Cnf field in the BCT table by incrementing the Cnf value by "1" (remains same if already at maximum counter value) if the branch instruction classification in 722 matches its Btype value, or by decrementing (decreasing) the Cnf value by "1" if the branch instruction classification does not match its Btype value. The Cnf field value may be used to determine the accuracy of branch classification for a branch instruction.

In an exemplary embodiment, where the BCU of FIG. 3 is implemented in hardware, the methods described herein, such as process 700 of FIG. 1, can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor comprising:
a processor pipeline comprising one or more execution units configured to execute branch instructions;
a branch predictor associated with the processor pipeline and configured to predict outcomes of the branch instructions; and
a branch classification unit associated with the processor pipeline and the branch predictor, and configured to, in response to detecting a branch instruction, classify the detected branch instruction as at least one of the following: static taken branch, static not-taken branch, simple easy-to-predict branch, flip flop hard-to-predict (HTP) branch, dynamic HTP branch, biased positive HTP branch, biased negative HTP branch, and other HTP branch, wherein the branch classification unit comprises a branch classification table (BCT) including one or more BCT entries, wherein each of the one or more BCT entries comprises a confusion matrix configured to record an actual outcome and a predicted outcome for a corresponding branch instruction,
wherein the branch classification unit is configured to, in response to detecting the detected branch instruction, classify the detected branch instruction by:
extracting a tag from an instruction address of the detected branch instruction;
using the tag to determine whether at least one of the one or more BCT entries corresponds to the detected branch instruction; and
in response to determining that none of the one or more BCT entries correspond to the detected branch instruction:
creating a new BCT entry in the BCT corresponding to the detected branch instruction, and
initializing a branch type BCT field in the new BCT entry by assigning an initial classification to the detected branch instruction of a simple easy-to-predict branch, and
wherein, in response to determining that none of the one or more BCT entries correspond to the detected branch instruction, the processor performs the steps of:
predicting, by the branch predictor, a predicted outcome of the detected branch instruction;
executing the detected branch instruction to determine an actual outcome of the detected branch instruction;
recording in a confusion matrix in the new BCT entry the actual outcome of the detected branch instruction and the predicted outcome of the detected branch instruction;
updating a current branch outcome BCT field of the new BCT entry and a branch switch count BCT field of the new BCT entry based on the actual outcome of the detected branch instruction;
computing a set of classifier parameters for the detected branch instruction associated with the new BCT entry using values included in the confusion matrix in the new BCT entry, the current branch outcome BCT field in the new BCT entry, and the branch switch count BCT field in the new BCT entry;
classifying the detected branch instruction associated with the new BCT entry based on the set of classifier parameters; and
updating, in response to classifying the detected branch instruction associated with the new BCT entry based on the set of classifier parameters, the branch type BCT field of the new BCT entry for the detected branch instruction.

2. The processor of claim 1 wherein the one or more BCT entries includes a plurality of BCT entries, and the plurality of BCT entries are organized as a direct-mapped table, a fully associative table, or an n-way set associative table.

3. The processor of claim 1, wherein each of the one or more BCT entries further includes one or more of the following BCT fields: a tag BCT field, a current branch outcome BCT field, a confidence BCT field, and a usefulness bits BCT field.

4. The processor of claim 1, wherein the confusion matrix of each of the one or more BCT entries comprises the following fields: Actual Taken/Predicted Taken (T/T), Actual Not Taken/Predicted Taken (NT/T), Actual Taken/Predicted Not Taken (T/NT), and Actual Not Taken/Predicted Not Taken (NT/NT), and wherein each of the fields of the confusion matrix of each of the one or more BCT entries is six bits long.

5. The processor of claim 1, wherein in response to determining that the at least one of the one or more BCT entries corresponds to the detected branch instruction, the processor performs the steps of:
predicting, by the branch predictor, a predicted direction of the detected branch instruction;
executing the detected branch instruction to determine an actual direction outcome of the detected branch instruction;
updating a given confusion matrix in the at least one of the one or more BCT entries corresponding to the detected branch instruction by recording the actual direction of the detected branch instruction and the predicted direction of the detected branch instruction;
updating a current branch outcome BCT field of the at least one of the one or more BCT entries corresponding to the detected branch instruction and a branch switch count BCT field of the at least one of the one or more BCT entries corresponding to the detected branch instruction based on the actual direction of the detected branch instruction;
computing a set of classifier parameters using values included in the updated given confusion matrix, the current branch outcome BCT field in the at least one of the one or more BCT entries corresponding to the detected branch instruction, and the branch switch count BCT field in the at least one of the one or more BCT entries corresponding to the detected branch instruction; and classifying the detected branch instruction based on the set of classifier parameters computed using the values included in the updated given confusion matrix, the current branch outcome BCT field in the at least one of the one or more BCT entries corresponding to the detected branch instruction, and the branch switch count BCT field in the at least one of the one or more BCT entries corresponding to the detected branch instruction.

6. The processor of claim 5, wherein in response to determining that the at least one of the one or more BCT entries corresponds to the detected branch instruction, the processor is further configured to reset the given confusion matrix in the at least one of the one or more BCT entries that corresponds to the detected branch instruction upon classification of the detected branch instruction.

7. The processor of claim 1, wherein the branch classification unit is further configured to track usefulness of the detected branch instruction by incrementing a usefulness (U) bits field in the BCT every time the detected branch instruction is executed.

8. The processor of claim 1, wherein the branch classification unit is further configured to calculate a confidence level of a branch classification.

9. A computing system comprising:
a memory; and
a processor, wherein the processor comprises:
a processor pipeline comprising one or more execution units configured to execute branch instructions,
a branch predictor associated with the processor pipeline and configured to predict outcomes of the branch instructions, and
a branch classification unit associated with the processor pipeline and the branch predictor, and configured to, in response to detecting a branch instruction, classify the detected branch instruction as at least one of the following: static taken branch, static not-taken branch, simple easy-to-predict branch, flip flop hard-to-predict (HTP) branch, dynamic HTP branch, biased positive HTP branch, biased negative HTP branch, and other HTP branch,
wherein the branch classification unit comprises a branch classification table (BCT) including one or more BCT entries, wherein each of the one or more BCT entries comprises a confusion matrix configured to record an actual outcome and a predicted outcome for a corresponding branch instruction,
wherein the branch classification unit is configured to, in response to detecting the detected branch instruction, classify the detected branch instruction by:
extracting a tag from an instruction address of the detected branch instruction;
using the tag to determine whether at least one of the one or more BCT entries corresponds to the detected branch instruction; and
in response to determining that none of the one or more BCT entries correspond to the detected branch instruction:
creating a new BCT entry in the BCT to correspond to the detected branch instruction, and initializing a branch type BCT field in the new BCT entry by assigning an initial classification to the detected branch instruction of a simple easy-to-predict branch, and wherein, in response to determining that none of the one or more BCT entries correspond to the detected branch instruction, the processor performs the further steps of:
predicting, by the branch predictor, a predicted outcome of the detected branch instruction;
executing the detected branch instruction to determine an actual outcome of the detected branch instruction;
recording in a confusion matrix in the new BCT entry the actual outcome of the detected branch instruction and the predicted outcome of the detected branch instruction;
updating a current branch outcome BCT field of the new BCT entry and a branch switch count BCT field of the new BCT entry based on the actual outcome of the detected branch instruction;
computing a set of classifier parameters for the detected branch instruction associated with the new BCT entry using values included in the confusion matrix in the new BCT entry, the current branch outcome BCT field in the new BCT entry, and the branch switch count BCT field in the new BCT entry;
classifying the detected branch instruction associated with the new BCT entry based on the set of classifier parameters; and
updating, in response to classifying the detected branch instruction associated with the new BCT entry based upon the set of classifier parameters, the branch type BCT field for the detected branch instruction.

10. The computing system of claim 9, wherein each of the one or more BCT entries further includes one or more of the following fields: a tag BCT field, a branch type BCT field, a confidence BCT field, and a usefulness bits BCT field.

11. A processor comprising:
a processor pipeline comprising one or more execution units configured to execute branch instructions;
a branch predictor associated with the processor pipeline and configured to predict outcomes of the branch instructions; and
a branch classification unit associated with the processor pipeline and the branch predictor, and configured to, in response to detecting a branch instruction, classify the detected branch instruction as at least one of the following: static taken branch, static not-taken branch, simple easy-to-predict branch, flip flop hard-to-predict (HTP) branch, dynamic HTP branch, biased positive HTP branch, biased negative HTP branch, and other HTP branch,
wherein the branch classification unit comprises a branch classification table (BCT) including one or more BCT entries, wherein each of the one or more BCT entries comprises a confusion matrix configured to record an actual outcome and a predicted outcome for a corresponding branch instruction,
wherein the branch classification unit is configured to, in response to detecting the detected branch instruction, classify the detected branch instruction by:
extracting a tag from an instruction address of the detected branch instruction; and using the tag to determine whether at least one of the one or more BCT entries corresponds to the detected branch instruction, wherein the processor, in response to determining that none of the one or more BCT entries correspond to the detected branch instruction, is configured to:

create a new BCT entry in the BCT to correspond to the detected branch instruction, and initialize a branch type BCT field in the new BCT entry by assigning an initial classification to the detected branch instruction of a simple easy-to-predict branch, and wherein the branch classification unit is configured to, in response to determining that the at least one of the one or more BCT entries corresponds to the detected branch instruction, classify the detected branch instruction by:

predicting, by the branch predictor, a predicted outcome of the detected branch instruction;

executing the detected branch instruction to determine an actual outcome of the detected branch instruction;

updating a given confusion matrix in the at least one of the one or more BCT entries corresponding to the detected branch instruction by recording the actual outcome of the detected branch instruction and the predicted outcome of the detected branch instruction;

updating a current branch outcome BCT field of the at least one of the one or more BCT entries corresponding to detected branch instruction and a branch switch count BCT field of the at least one of the one or more BCT entries corresponding to the detected branch instruction based on the actual outcome of the detected branch instruction;

computing a set of classifier parameters for the detected branch instruction using values included in the updated given confusion matrix, the current branch outcome BCT field, and the branch switch count BCT field of the at least one of the one or more BCT entries corresponding to the detected branch instruction; and classifying the detected branch instruction based on the set of classifier parameters.

12. The processor of claim 11, wherein, in response to determining that the at least one of the one or more BCT entries corresponds to the detected branch instruction, the processor is further configured to reset, in response to classifying the detected branch instruction based upon the set of classifier parameters, the given confusion matrix in the at least one of the one or more BCT entries corresponding to the detected branch instruction.

13. The processor of claim 11, wherein the branch classification unit is further configured to track usefulness of the detected branch instruction by incrementing a usefulness (U) bits field in the BCT every time the detected branch instruction is executed.

14. The processor of claim 11, wherein the branch classification unit is further configured to calculate a confidence level of a branch classification.

15. The processor of claim 11, wherein the one or more BCT entries includes a plurality of BCT entries, and the plurality of BCT entries are organized as a direct-mapped table, a fully associative table, or an n-way set associative table.

16. The processor of claim 11, wherein each of the one or more BCT entries further includes one or more of the following BCT fields: a tag BCT field, a confidence BCT field, and a usefulness bits BCT field.

17. The processor of claim 11, wherein the confusion matrix of each of the one or more BCT entries comprises the following fields: Actual Taken/Predicted Taken (T/T), Actual Not Taken/Predicted Taken (NT/T), Actual Taken/Predicted Not Taken (T/NT), and Actual Not Taken/Predicted Not Taken (NT/NT), and wherein each of the fields of the confusion matrix of each of the one or more BCT entries is six bits long.

18. The processor of claim 11, wherein the processor is further configured to, in response to determining that none of the one or more BCT entries correspond to the detected branch instruction:

predict, by the branch predictor, a predicted direction of the detected branch instruction;

execute the detected branch instruction to determine an actual direction of the detected branch instruction;

wherein the branch classification unit, in response to determining that none of the one or more BCT entries correspond to the detected branch instruction, is further configured to:

record in a confusion matrix in the new BCT entry corresponding to the detected branch instruction the actual direction of the detected branch instruction and the predicted direction of the detected branch instruction;

update a current branch outcome BCT field of the new BCT entry and a branch switch count BCT field of the new BCT entry based on the actual direction of the detected branch instruction;

compute a set of classifier parameters for the detected branch instruction associated with the new BCT entry using values included in the confusion matrix in the new BCT entry, the current branch outcome BCT field in the new BCT entry, and the branch switch count BCT field in the new BCT entry;

classify the detected branch instruction associated with the new BCT entry based on the set of classifier parameters computed using the values included in the confusion matrix in the new BCT entry, the current branch outcome BCT field in the new BCT entry, and the branch switch count BCT field in the new BCT entry; and update, in response to the classification of the detected branch instruction associated with the new BCT entry based on the set of classifier parameters computed using the values included in the confusion matrix in the new BCT entry, the current branch outcome BCT field in the new BCT entry, and the branch switch count BCT field in the new BCT entry, the branch type BCT field of the new BCT entry for the detected branch instruction.

* * * * *